United States Patent
Pettersen et al.

(10) Patent No.: US 8,625,388 B2
(45) Date of Patent: Jan. 7, 2014

(54) VOLTAGE LEAKAGE DETECTION FOR SERIALLY CONNECTED ELECTRICAL NODES IN A SEISMIC SURVEYING SYSTEM

(75) Inventors: Jostein Fonneland Pettersen, Oslo (NO); Sylvain Petithomme, Oslo (NO)

(73) Assignee: WesternGeco L.L.C., Houston, TX (US)

( * ) Notice: Subject to any disclaimer, the term of this patent is extended or adjusted under 35 U.S.C. 154(b) by 1728 days.

(21) Appl. No.: 11/640,589

(22) Filed: Dec. 18, 2006

(65) Prior Publication Data

US 2008/0008030 A1    Jan. 10, 2008

Related U.S. Application Data

(60) Provisional application No. 60/806,622, filed on Jul. 5, 2006.

(51) Int. Cl.
*G01V 1/22* (2006.01)
(52) U.S. Cl.
USPC .............................................. 367/20; 367/153
(58) Field of Classification Search
USPC ...................................... 367/20, 153, 154, 13
See application file for complete search history.

(56) References Cited

U.S. PATENT DOCUMENTS

| | | | | |
|---|---|---|---|---|
| 4,166,270 | A | * | 8/1979 | Brastins et al. ................. 367/13 |
| 4,503,526 | A | * | 3/1985 | Beauducel et al. ............. 367/20 |
| 5,117,426 | A | * | 5/1992 | McAdams ..................... 714/721 |
| 5,883,856 | A | * | 3/1999 | Carroll et al. ................... 367/13 |
| 7,176,589 | B2 | * | 2/2007 | Rouquette ....................... 307/17 |
| 2006/0233051 | A1 | * | 10/2006 | Nemeth .......................... 367/76 |
| 2008/0008041 | A1 | | 1/2008 | Pettersen et al. ................ 367/76 |

FOREIGN PATENT DOCUMENTS

| | | | |
|---|---|---|---|
| CA | 2593640 | 6/2007 | ............... G01V 1/20 |
| CA | 2593103 | 7/2007 | ............... G01V 1/20 |

OTHER PUBLICATIONS

Specification, Claims, Abstract, Drawings for U.S. Appl. No. 11/640,786.
Office Action mailed Dec. 3, 2008 for U.S. Appl. No. 11/640,786.

* cited by examiner

*Primary Examiner* — Ian J Lobo

(57) ABSTRACT

A seismic survey apparatus includes a plurality of serially connected electrical nodes; a power supply capable of supplying power to the electrical nodes and detecting a voltage leakage among the electrical nodes; and a software component capable of locating the leakage upon its detection. A method for use in seismic surveying includes powering a plurality of serially connected electrical nodes in a seismic surveying system; automatically detecting a voltage leakage among the electrical nodes on the power domain; and automatically locating the detected voltage leakage.

26 Claims, 4 Drawing Sheets

VOLTAGE LEAKAGE DETECTION FOR SERIALLY CONNECTED ELECTRICAL NODES IN A SEISMIC SURVEYING SYSTEM

The current non-provisional patent application claims the priority of co-pending provisional patent application, attorney docket number 14.303-U.S.-PRO, Ser. No. 60/806,622, filed on Jul. 5, 2006 by the same inventors, with the same title.

BACKGROUND OF THE INVENTION

1. Field of the Invention

The present invention pertains to voltage leakage detection in seismic electrical systems and, more particularly, leakage detection seismic surveying systems comprising serially connected nodes.

2. Description of the Related Art

Seismic surveying is a method for determining the structure of subterranean formations in the earth. Seismic surveying typically utilizes seismic energy sources which generate seismic waves and seismic receivers which detect seismic waves. The seismic waves propagate into the formations in the earth, where a portion of the waves reflects from interfaces between subterranean formations. The seismic receivers detect the reflected seismic waves and convert the reflected waves into representative electrical signals. The signals are typically transmitted by electrical, optical, radio or other means to devices which record the signals. Through analysis of the recorded signals (or traces), the shape, position and composition of the subterranean formations can be determined.

One concern in a land-based seismic survey is "earth leakage", a condition which may expose a person or animal to dangerous voltage levels. A seismic survey system is typically laid out with a series of units connected together by a seismic cable in between. Cables, connectors and units transferring or relaying electrical power in a seismic survey system are subject to earth leakage situations. There can be several hundred units in each power domain and 10s of meters of cable between them, making the whole power domain span several kilometers. Thus, not only are there typically a very large number of places in which earth leakage might occur, but they usually are spread out over large distances. Locating and fixing an earth leakage condition can therefore be a time consuming and difficult task.

Seismic survey systems therefore usually provide for some kind of automatic detection of and protection from earth leakage. Conventional earth leakage detection/protection systems introduce a ground wire and force the output voltage to balance around earth. The current in the ground wire should nominally be close to, or at, zero. This current is monitored, and if it increases beyond a set limit, switches turn off the voltage to the whole power domain.

Conventional earth leakage detection and protection systems, although helpful and desirable, have several drawbacks. When an earth leakage occurs, the whole line of units in the affected power domain loses power. There is no way to automatically diagnose where along the line the earth leakage is located, meaning it will take a long time to find the faulty segment. Intermittent failures that come and go and failures of short duration are even harder to find unless the system is taken back to camp and tested in a water tank or similar apparatus. Thus, while such systems are suitable for their intended purpose, improvement in these respects would be desirable.

The present invention is directed to resolving, or at least reducing, one or all of the problems mentioned above.

SUMMARY OF THE INVENTION

The invention includes, in its various aspects and embodiments, a seismic surveying apparatus and a method for use in a seismic survey. The seismic survey apparatus includes a plurality of serially connected electrical nodes; a power supply capable of supplying power to the electrical nodes and detecting a voltage leakage among the electrical nodes; and a software component capable of locating the leakage upon its detection. The method for use in seismic surveying includes powering a plurality of serially connected electrical nodes in a seismic surveying system; automatically detecting a voltage leakage among the electrical nodes on the power domain; and automatically locating the detected voltage leakage.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, the drawings illustrate specific embodiments herein described in detail by way of example. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Figure 1:
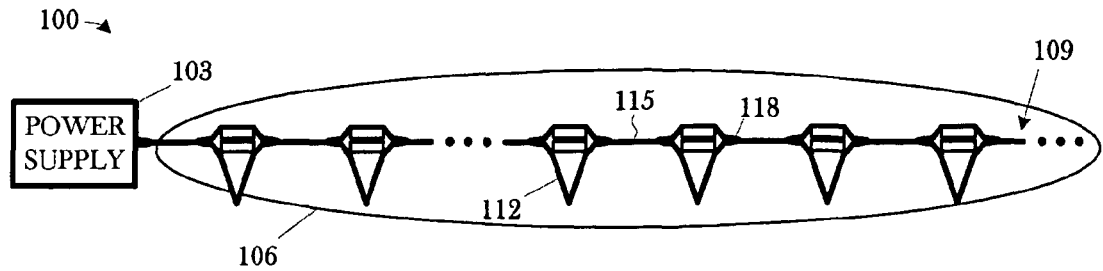
FIG. 1 depicts a portion of a seismic survey spread in which the present invention is applied.

FIG. 1 depicts a portion 100 of a seismic survey spread (not otherwise shown) in which the present invention is applied. The portion 100 includes a power supply 103 and a power domain 106 receiving power from the power supply 103. A seismic survey spread may, and typically will, comprise several power domains 106. The power domain 106 encompasses a seismic cable 109 comprising a plurality of seismic sensors 112 (only one indicated) connected by line segments 115 (only one indicated). Each seismic sensor 112 represents a node within the power domain 106. Each line segment 115, in the illustrated embodiment, may include a connector 118 (only one indicated) on either end. The seismic sensors 112 are serially connected on the seismic cable 109. The line segments 115 and connectors 118 may be implemented in conventional fashion. The particular implementation may vary depending on the context in which the particular embodiment is employed. For instance, in a seabed survey, electrical connections must be water tight at depth, which may not be true of a land-based survey.

Figure 2:
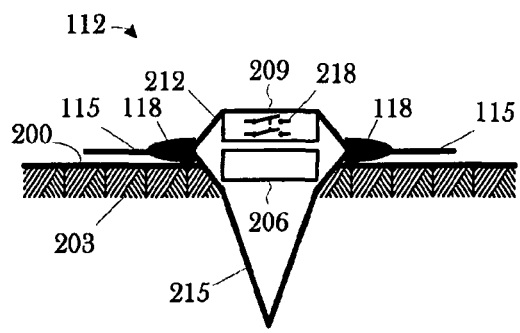
FIG. 2 conceptually illustrates one of the seismic sensors positioned as in a setup for a seismic survey.

FIG. 2 conceptually illustrates one of the seismic sensors 112 positioned on a surface 200 of the ground 203. The seismic sensors 112 of the illustrated embodiment are built substantially the same, although the invention does not require this. The seismic sensor 112 generally comprises a sensing element 206 and a set of electronics 209 situated in a housing 212. The housing 212 includes a spike 215 to help ensure good coupling between the sensing element 206 and the ground 203. Note that the invention is not limited by the structure or design of the housing 212. The sensing element 206 may be implemented in, for example, a conventional geophone as is common and well known in the art.

The electronics 209 are conventional except for the inclusion of a power switch 218. The power switch 218, conceptually shown as a double pole, single throw switch. The power switch 218 is a double pole switch so that both the positive and negative terminal are disconnected in an earth leakage situation. The power switch 218 controls the flow of power from the power supply 103 to sensors 112 downstream, i.e., down the seismic cable 115 in the direction away from the power supply 103. The invention admits variation in the implementation of the power switch 218.

The power supply 103 is an isolated power supply, i.e., isolated from the earth, loosely balanced around the earth, e.g., if the power supply 103 is a 100 V power supply, it will output ±50 V relative to the earth's potential. The power supply 103 is, in the illustrated embodiment, implemented in the data collection unit for the seismic survey. As those in the art will appreciate, a seismic survey typically includes a data collection unit that performs several functions. It sends command and control signals, for example, that control the operation of the components in the seismic survey system. The data collection unit provides power; receives data generated by the seismic sensors; and sometimes processes or pre-processes the data. In this embodiment, the data collection unit is used to provide power to the power domain 106. However, in alternative embodiments, the power supply 103 might be implemented in, for example, a power supply that is not a part of the data collection unit.

Figure 3A:
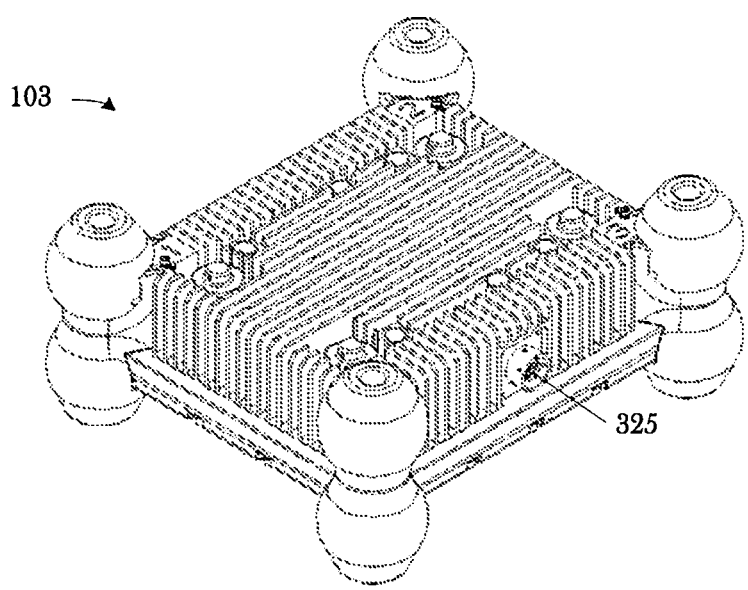
FIG. 3A and FIG. 3B conceptually illustrate selected portions of a data collection unit as may be used to implement the power supply in the embodiment of FIG. 1.
Figure 3B:
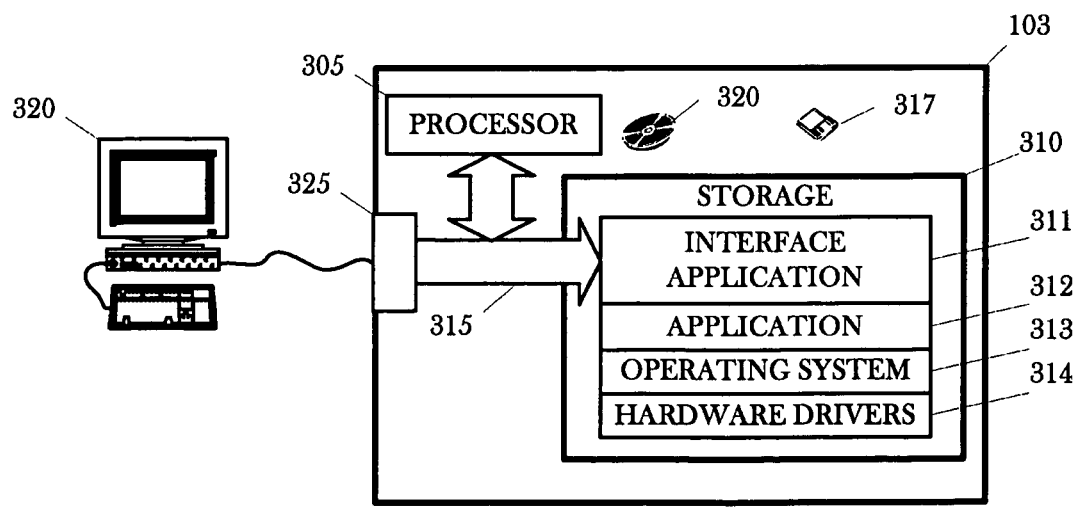

FIG. 3A and FIG. 3B illustrate selected portions of the hardware and software architecture of one particular embodiment of the power supply unit 103. The power supply 103 includes a processor 305 communicating with storage 310 over a bus system 315. The storage 310 may include a hard disk, a flash disk and/or random access memory ("RAM") and/or removable storage such as a floppy magnetic disk 317 and an optical disk 320. The storage 310 is encoded an interface application 311, an application 312, an operating system 313, and some hardware drivers 314. The processor 305 runs under the control of the operating system 313, which may be practically any operating system known to the art. The application 312 is invoked by the operating system 313 upon power up, reset, or both, depending on the implementation of the operating system 313. The power supply 103 communicates with a user interface 320 (e.g., a PC- or UNIX-based workstation) over a port 325.

Figure 4A:
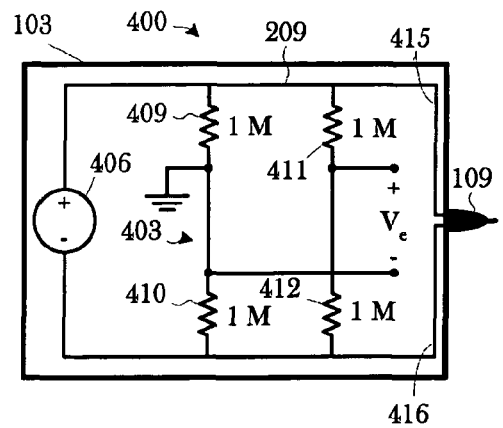
FIG. 4A-FIG. 4B depict a leakage detection circuit as it may be used in the power supply of FIG. 1.
Figure 4B:
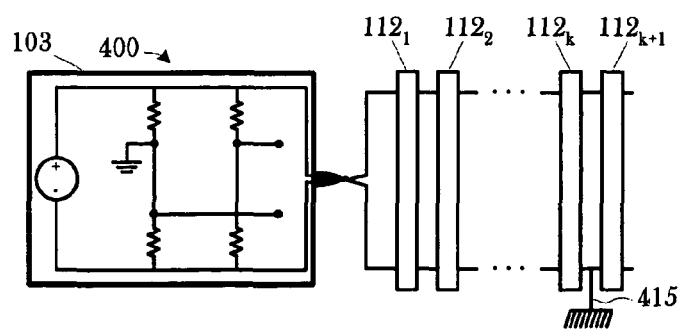

The power supply 103 is equipped with a voltage leakage detection circuit 400, shown in FIG. 4A. The voltage leakage detection circuit 400 comprises a bridge 403 through which the supply voltage 406 is transmitted over the seismic cable 109 to the seismic sensors 112, shown in FIG. 1. The bridge 403 comprises four high impedance (for example, 1 MΩ) resistors 409-412 and is grounded to earth as shown. As long as there is no earth leakage, the bridge 403 is symmetrical and the error voltage $V_e$ is zero. The power supply 406 itself is free floating relative to earth potential, so the left resistor pair 409, 410 divides the supply voltage 406 in two halves having opposite polarities seen from the earth reference. When one of the supply wires 415, 416 touches conductive earth, an imbalance is introduced to the bridge 403. In the FIG. 4A, the lower left bridge resistor 410 is paralleled by the leakage 415 when a leakage occurs, as is shown in FIG. 4B.

More particularly, assume the system in FIG. 1 is up and running with no earth leakage. Assume that there are n seismic sensors 112 on the seismic cable 109, i.e., seismic sensors $112_1$-$112_n$. Since there is no earth leakage, the power supply 103 balances around the earth and the error voltage $V_e$ is close to 0. Then an earth leakage occurs somewhere along the power domain 106. This means one terminal touches conductive earth or something with low resistivity to earth. As a result, an imbalance in the detection bridge 403 is generated as mentioned above, which gives an error voltage $V_e$.

Figure 5:
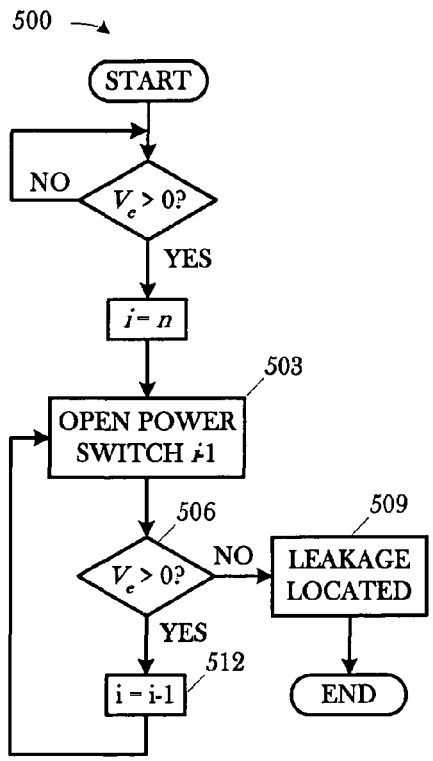
FIG. 5 charts software-implemented technique used to locate a detected leakage in the embodiment of FIG. 1.

The error voltage $V_e$ triggers a software-implemented search 500, illustrated in FIG. 5, by the application 312, shown in FIG. 3B. The power supply 103 sends a command (at 503) to seismic sensor $112_{n-1}$, telling it to open its power switch $218_{n-1}$, thereby removing the relay of power to seismic sensor $112_n$. The command is sent in the form of an electronic command and control signal over the seismic cable 109. Seismic sensor $112_n$ is then without power. If the earth leakage goes away (at 506) when the power switch $218_{n-1}$ is opened, the earth leakage is located (at 509) between seismic sensor $112_{n-1}$ and seismic sensor $112_n$.

If the error voltage $V_e$ persists after the power switch $218_{n-1}$ is opened, then the earth leakage is not between the seismic sensors $112_{n-1}$ and $112_n$. The power supply 103, through the application 312, then instructs (at 503) the seismic sensor $112_{n-2}$ to open its power switch $218_{n-2}$. If the error voltage $V_e$ goes to 0 (at 506), the earth leakage is located (at 509) between seismic sensor $112_{n-2}$ and seismic sensor $112_{n-1}$. If the error voltage $V_e$ persists, the power supply 103 iterates (at 512) the process, walking its way back "up" the seismic cable 109 through each of the seismic sensors 112 until the earth leakage is located. The earth leakage is now located and must be changed before power can be re-applied to the seismic sensors 112 "downstream" from it. The seismic sensors 112 are "downstream" from the power supply 103 in the sense that power flows to them from the power supply 103. (Similarly, the seismic sensor $122_n$ is downstream from the seismic sensor $122_{n-1}$ in the sense that power flows from the power supply 103 to the seismic sensor $122_n$ through the seismic sensor $122_{n-1}$.) Conversely, the power supply 103 is "upstream" from the seismic sensors 112.

As previously mentioned, the invention admits variation in implementation. For instance, consider the embodiment of FIG. 6. A portion 600 of a seismic survey spread (not otherwise shown) in including two power supplies $103_M$, $103_S$ one on either end of the seismic cable 109. A leakage detection circuit 400, shown in FIG. 4A, is placed in both the power supplies 103. In this particular embodiment, an error voltage $V_e$ detected in either power supply 103 triggers a software-implemented search 700, illustrated in FIG. 7, by the application 312, shown in FIG. 3B.

In this particular embodiment, the seismic sensors 112 are powered from two sides and a binary search is performed. One of the power supplies $103_M$ is designated the "master power supply." Assume again there are n seismic sensors $112_1$-$112_n$ and there are n+1 line segments $115_1$-$115_{n+1}$. In the following discussion, to open switch i is to open the switch 218 in the seismic sensor 112 to the right of the line segment $115_i$. The master power supply $103_M$ commands seismic sensor $112_{(n+1)/2}$, telling it to open its power switch $218_{(n+1)/2}$ (at 703). (Note that if i is odd, such that it is not evenly divisible, the illustrated embodiment rounds down.) Since the system is powered from two sides, all seismic sensors 112 are still receiving power either from the left or the right side, but only one of the power supplies 103 will see the earth leakage now. It then follows that the earth leakage is located between the seismic sensor $112_{(n+1)/2}$ and the power supply 103 seeing the earth leakage.

The master power supply $103_M$ tells seismic sensor $112_{(n+1)/2}$ to close (at 706) its power switch $218_{(n+1)/2}$ again. The line segment 115 containing the earth leakage is again divided in two using a binary search. So, if the earth leakage occurred between the master power supply $103_M$ and the seismic sensor $112_{(n+1)/2}$, then the master power supply $103_M$ instructs the seismic sensor $112_{(n+1)/4}$ to open its power switch $218_{(n+1)/4}$. On the other hand, if the earth leakage is between the master power supply $103_S$ and the seismic sensor $112_{(n+1)/2}$, the master power supply $103_M$ tells the seismic sensor $112_{3n/4}$ to open its power switch $218_{(3n+1)/4}$. Again, all seismic sensors 112 receive power either from the left or the right side while only one of the power supplies 103 sees the earth leakage. The process iterates until the earth leakage is located and disconnected (at 709). The line segment 115 on which the earth leakage is located is now unpowered. Operation will still be possible, even before the line segment 115 is changed. This way the operational impact of the earth leakage is minimal.

Figure 7:
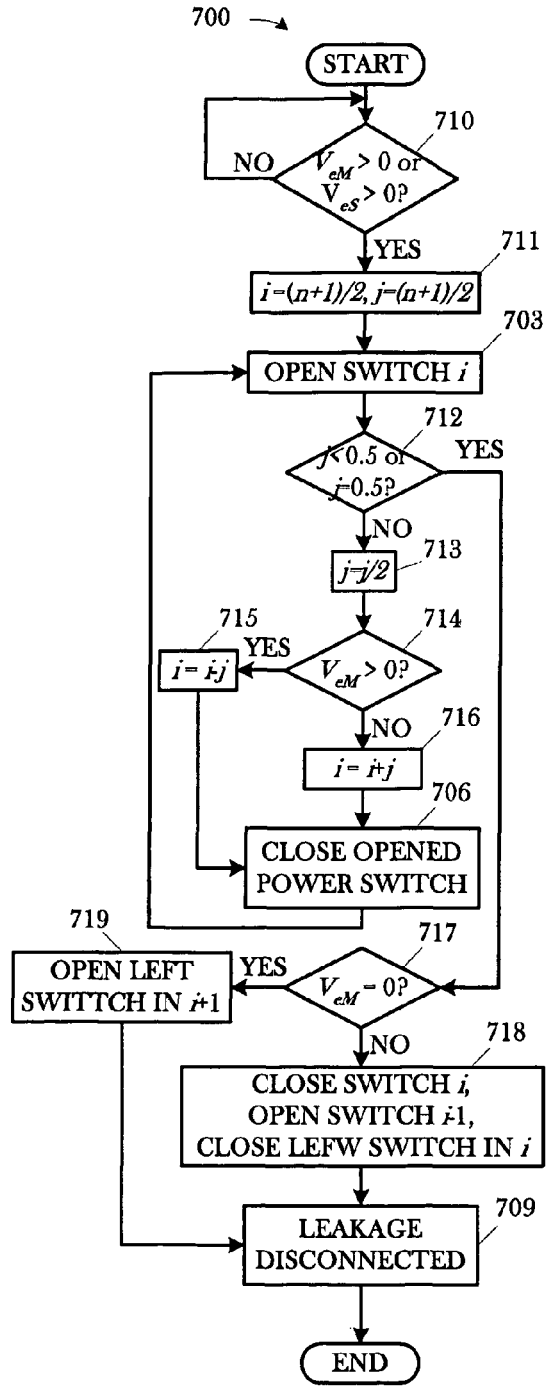
FIG. 7 charts software-implemented technique used to locate a detected leakage in the embodiment of FIG. 6.

More specifically, with reference to FIG. 7, If $V_{eM}>0$ or $V_{eS}>0$ (at 710), then the indexes i,j are set (at 711) such that i=(n+1)/2 and j=(n+1)/2. The switch i (rounding down if needed) is then opened (at 703). If (at 712) j is not ≤0.5, then j=j/2 (at 713). If (at 714) $V_{eM}>0$, then i=i−j (at 715); otherwise, i=i+j (at 716). The opened switch is then closed (at 706) and the next switch i is then opened (at 703) at the process iterates.

If (at 712) j≤0.5 and $V_{eM}=0$ (at 717), the voltage leakage is on the line segment 115 to the right of the seismic sensor $112_i$, otherwise it is on the line segment 115 to the left of the seismic sensor $112_i$. To disconnect the line segment 115 (at 718) to the left, close switch i, open switch i−1, close left switch in i. To disconnect the line segment 115 (at 719) to the right, open (at 719) the left switch in i+1. The line segment 115 with earth leakage is now disconnected (at 709).

Note that the invention admits variation in how the search is performed. For instance, the binary search described above for use in the embodiment of FIG. 6 may be employed in the embodiment of FIG. 1 instead of the linear search described. Any suitable searching technique known to the art may be employed. However, the binary search will generally be the fastest.

An earth leakage detection system such as the earth leakage detection circuit 400 is employed even though the power supply is isolated from earth. For instance, in an earth leakage situation, there could be a current path from one terminal through the earth leakage, then from earth through a conductive element (e.g., a person) touching the other terminal. Two unrelated faults are needed to incur this potentially dangerous situation. Therefore the time to react to and remove the first fault is relaxed (e.g., a few seconds) compared to the conventional approach (e.g., 20-50 milliseconds).

Furthermore, the locating functionality is in the application 312, shown in FIG. 3B, which executes the particular search strategy of a given implementation. Those in the art having the benefit of this disclosure will appreciate that this is not necessary to the practice of the invention. The searching functionality may, for instance, be executed a process or thread controlled by the operating system 313, in alternative embodiments. Any suitable software component known to the art may also be used to implement the locating functionality.

Still further, the above discussion identifies the seismic sensors 112 as the serially connected electrical nodes. However, the invention is not so limited, and contemplates that other components of the seismic survey spread might also constitute electrical nodes within the meaning of the invention. For instance, the power supply 103 may constitute a serially connected electrical node in some embodiments. Some embodiments may also employ survey spreads with a higher degree of sophistication in data collection, e.g., a networked spread that employs packet messages and data routers. The data routers in such embodiments may also be serially connected electrical nodes.

Figure 6:
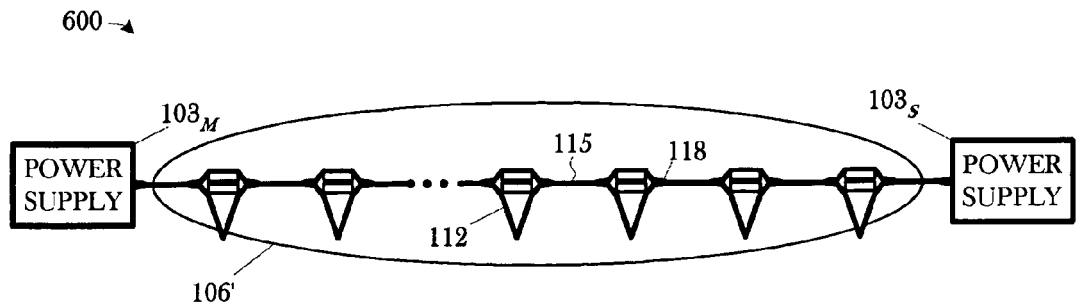
FIG. 6 depicts a second portion of a seismic survey spread in which the present invention may be applied.

The above embodiments in FIG. 1 and FIG. 6 are both land based surveys. However, the invention is not so limited. Marine seismic surveys come in two basic types—towed streamer surveys and seabed surveys. The invention may be employed in either type of marine survey. Both streamers and ocean bottom cables used in seabed surveys may be considered "seismic cables", although some aspects of their structure, operation, and use differ from that of seismic cables used in land-based surveys in ways well known to the art. Consequently, matters of design, construction and operation not relevant to the present invention are not further discussed for the sake of clarity and so as not to obscure the present invention.

Figure 8:
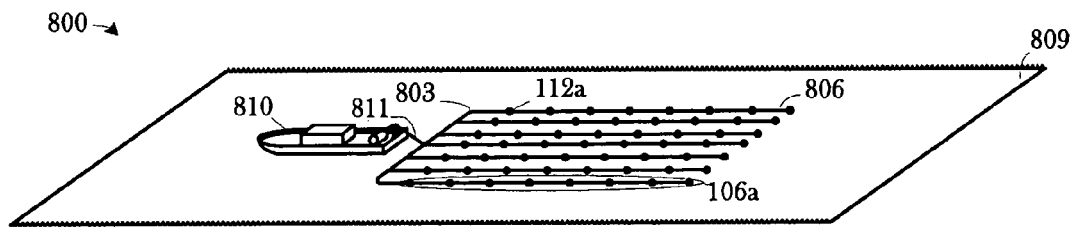
FIG. 8-FIG. 9 illustrate a towed streamer and a seabed marine survey, respectively, in which the present invention may be employed.

More particularly, in towed streamer surveys, such as the survey 800 shown in FIG. 8, arrays 803 of seismic streamers 806 (only one indicated) containing seismic sensors 112a (only one indicated) are towed by a survey vessel 810 at or near the water's surface 809. The sensing element (not shown) of the seismic sensors 112a may be, for example, hydrophones and the electronics (not shown) of each includes a power switch 218, such as that shown in FIG. 2. Power is supplied to the seismic sensors 112a from a data collection unit (not shown) on the vessel 810 through the tow cable 811 and the streamers 806. In such a survey, each streamer 806 may, for example, constitute a separate power domain 106a, in which the electronics of the seismic sensors 112a comprise a plurality of serially connected nodes. The leak detection works as is described above for the embodiment of FIG. 1.

Figure 9:
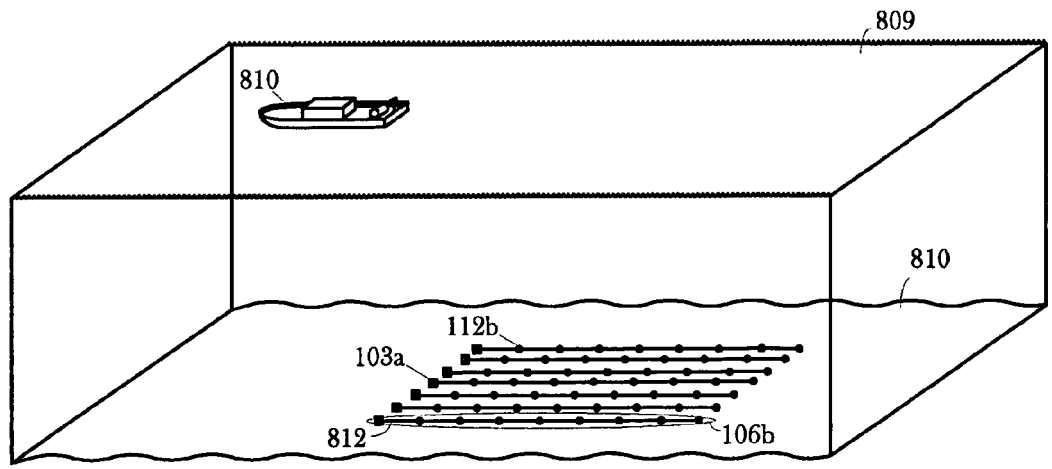

In seabed surveys such as that shown in FIG. 9, ocean bottom cables ("OBCs") 812 (only one indicated) are arrayed on the seabed 815 from the vessel 810 at the water's surface 809. Each OBC 812 comprises a plurality of seismic sensors 112b. The sensing elements (not shown) of the seismic sensors 112b may be, for example, either hydrophones or geophones. The electronics (not shown) of each will include a power switch 218, such as that shown in FIG. 2. Each OBC 812 includes a power supply 103a, as well, which provides power to the seismic sensors 112b over the OBCs 812. Each OBC 812 may define a power domain 106b, in which the electronics of the seismic sensors 112b comprises a plurality of serially connected nodes. The leak detection works as is described above for the embodiment of FIG. 1.

The present invention is therefore broader than detecting earth leakage in a land-based seismic survey. Accordingly, a seismic surveying apparatus, comprises a plurality of serially connected electrical nodes; a power supply capable of supplying power to the electrical nodes and detecting a voltage leakage among the electrical nodes; and a software component capable of locating the leakage upon its detection. In the method of the invention, a plurality of serially connected electrical nodes in a seismic surveying system is powered; a voltage leakage is automatically detected among the electrical nodes on the power domain; and the detected voltage leakage is automatically detected.

The present invention accordingly provides a voltage leakage detection in seismic electrical systems and, more particularly, voltage leakage detection for seismic electrical systems comprising serially connected nodes. The present invention, relative to conventional approaches:

provides automatic location of the voltage leakage;
prevents disruption in operation in some embodiments (e.g., the embodiment of FIG. 6); and
intermittent failures can be reported without the need to shut down the line of units.

Note that not all embodiments will manifest all of these advantages. Furthermore, those skilled in the art having the benefit of this disclosure may appreciate advantages not set forth above.

This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A seismic surveying apparatus, comprising:
    a plurality of serially connected electrical nodes;
    a power supply capable of supplying power to the electrical nodes and detecting a voltage leakage among the electrical nodes; and
    a software component capable of locating the leakage upon its detection.

2. The seismic surveying apparatus of claim 1, wherein the electrical nodes comprise at least one of seismic sensors, power supplies, and data routers.

3. The seismic surveying apparatus of claim 1, wherein power supply is one of the electrical nodes.

4. The seismic surveying apparatus of claim 1, wherein the electrical nodes include a power switch that may be opened upon instruction from the software component.

5. The seismic surveying apparatus of claim 1, wherein the power supply includes a leakage detection circuit by which it detects the voltage leakage.

6. The seismic surveying apparatus of claim 5, wherein the leakage detection circuit comprises a bridge across which the leakage will induce an error voltage.

7. The seismic surveying apparatus of claim 1, wherein the power supply comprises a portion of the data collection unit.

8. The seismic surveying apparatus of claim 7, wherein the software component resides on a storage of the data collection unit.

9. The seismic surveying apparatus of claim 1, wherein the software component performs a linear search or a binary search for the voltage leakage.

10. The seismic surveying apparatus of claim 1, further comprising a second power supply capable of supplying power to the electrical nodes and detecting the voltage leakage.

11. A method for use in seismic surveying, comprising:
    powering a plurality of serially connected electrical nodes in a seismic surveying system;
    automatically detecting a voltage leakage among the electrical nodes on the power domain; and
    automatically locating the detected voltage leakage.

12. The method of claim 11, wherein powering the electrical nodes includes powering the electrical nodes from a single side.

13. The method of claim 11, wherein powering the electrical nodes includes powering the electrical nodes from a both sides.

14. The method of claim 11, wherein powering the electrical nodes comprises powering at least one of seismic sensors, power supplies, and data routers.

15. The method of claim 11, wherein automatically detecting the voltage leakage includes automatically instructing the electrical nodes to open a respective power switch therefore.

16. The method of claim 11, wherein automatically detecting the voltage leakage includes automatically detecting an earth leakage.

17. The method of claim 11, wherein automatically detecting the voltage leakage includes detecting an error voltage generated by the voltage leakage.

18. The method of claim 11, wherein automatically locating the detected voltage leakage includes performing a linear search or a binary search.

19. An apparatus for use in seismic surveying, comprising:
    means for powering a plurality of serially connected electrical nodes in a seismic surveying system;
    means for automatically detecting a voltage leakage among the electrical nodes on the power domain; and
    means for automatically locating the detected voltage leakage.

20. The apparatus of claim 19, wherein the powering means includes means for powering the electrical nodes from a single side.

21. The apparatus of claim 19, wherein the powering means includes powering the electrical nodes from a both sides.

22. The apparatus of claim 19, wherein the powering means includes means for powering at least one of seismic sensors, power supplies, and data routers.

23. The apparatus of claim 19, wherein automatic detection means leakage includes means for automatically instructing the electrical nodes to open a respective power switch therefore.

24. The apparatus of claim 19, wherein the automatic detection means includes means for automatically detecting an earth leakage.

25. The apparatus of claim 19, wherein the automatic detection means includes means for detecting an error voltage generated by the voltage leakage.

26. The apparatus of claim 19, wherein the automatic location means includes means for performing a linear search or a binary search.

* * * * *

UNITED STATES PATENT AND TRADEMARK OFFICE
Certificate

Patent No. 8,625,388 B2                                                               Patented: January 7, 2014

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Jostein Engeseth Fonneland, Oslo (NO).

Signed and Sealed this Eighth Day of April 2014.

<div align="right">

ISAM ALSOMIRI
*Supervisory Patent Examiner*
Art Unit 3645
Technology Center 3600

</div>